(12) United States Patent
Klein et al.

(10) Patent No.: US 12,123,493 B2
(45) Date of Patent: Oct. 22, 2024

(54) EMERGENCY RELEASE OF A PARKING GEAR

(71) Applicant: ZF Friedrichshafen AG, Friedrichshafen (DE)

(72) Inventors: Julia Klein, Langenargen (DE); Tobias Miller, Waldburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/260,947

(22) PCT Filed: Dec. 22, 2021

(86) PCT No.: PCT/EP2021/087177
§ 371 (c)(1),
(2) Date: Jul. 11, 2023

(87) PCT Pub. No.: WO2022/152528
PCT Pub. Date: Jul. 21, 2022

(65) Prior Publication Data
US 2024/0052926 A1    Feb. 15, 2024

(30) Foreign Application Priority Data

Jan. 12, 2021   (DE) ............... 10 2021 200 200.5

(51) Int. Cl.
*F16H 63/34*    (2006.01)
(52) U.S. Cl.
CPC ..... *F16H 63/3491* (2013.01); *F16H 63/3483* (2013.01)
(58) Field of Classification Search
CPC .............. F16H 63/3491; F16H 63/3483
See application file for complete search history.

(56) References Cited

U.S. PATENT DOCUMENTS

| 2019/0257422 A1 | 8/2019 | Schlosser et al. |
| 2020/0182353 A1* | 6/2020 | Klein ............... F16H 21/44 |
| 2020/0248806 A1 | 8/2020 | Klein |

FOREIGN PATENT DOCUMENTS

| DE | 102017218748 A1 | 4/2019 |
| DE | 102018202370 A1 | 8/2019 |
| DE | 102018212175 A1 | 1/2020 |

OTHER PUBLICATIONS

International Search Report (English Translation) PCT/EP2021/087177, dated Feb. 23, 2022. (2 pages).

* cited by examiner

*Primary Examiner* — Terence Boes
(74) *Attorney, Agent, or Firm* — Dority & Manning, P.A.

(57) ABSTRACT

An emergency release of a parking lock of a vehicle transmission arranged in a transmission housing 9 includes an actuating element of an actuator for actuating the parking lock is drivable so as to be linearly movable between an interlock position and a release position. The emergency release lever 3 is pivotable away from a normal position past an emergency release position into an installation position and, in a second end region, has two guide projections 15, 16, which are parallel to each other and extend radially toward the pivot pin 7, and between which a securing projection 10, which is fixedly connected to the transmission housing 9, projects when the emergency release lever 3 is in the normal position and in the emergency release position. In the installation position of the emergency release lever 3, the securing projection 10 is located outside the area between the two guide projections 15, 16 on the emergency release lever 3.

11 Claims, 4 Drawing Sheets

EMERGENCY RELEASE OF A PARKING GEAR

CROSS-REFERENCE TO RELATED APPLICATION

The present application is related and claims priority to 102021200200.5 filed in the German Patent Office on Jan. 12, 2021 and to PCT/EP2021/087177 filed in the European Patent Office on Dec. 22, 2021, both of which are incorporated by reference in their entirety for all purposes.

FIELD OF THE INVENTION

The invention relates generally to an emergency release of a parking lock of a vehicle transmission arranged in a transmission housing.

BACKGROUND

In case of a breakdown of a vehicle, the parking lock is generally automatically activated. In order to salvage the vehicle or move the vehicle to another location, it is necessary to deactivate the activated parking lock. An emergency release of the parking lock serves this purpose.

Known emergency releases require a plurality of components and installing the emergency release lever and securing the release in an installation position is complex.

SUMMARY OF THE INVENTION

In example embodiments, an emergency release of a parking lock of a vehicle transmission is arranged in a transmission housing. An actuating element of an actuator for actuating the parking lock is drivable so as to be linearly movable between an interlock position and a release position, and the actuating element can be acted upon from a first end region of an emergency release lever so as to be movable away from the interlock position past the release position into an emergency release position. The emergency release lever is connected at a second end region to a pivot pin for conjoint rotation, the pivot pin radially projecting from the emergency release lever and being mounted at the transmission housing so as to be pivotable about the longitudinal axis. When the actuating element is in the interlock position and in the release position, the emergency release lever is in a normal position, from which the emergency release lever is drivable so as to be pivotable into the emergency release position.

Example aspects of the invention provide an emergency release of a parking lock of the aforementioned type, the emergency release lever of which has a simple design and is easily installable and securable in the installation position.

Example aspects of the invention configure the emergency release lever to be pivotable away from the normal position past the emergency release position into an installation position and, in the second end region, have two guide projections, which are parallel to each other and extend radially toward the pivot pin, and between which a securing projection, which is fixedly connected to the transmission housing, projects when the emergency release lever is in the normal position and in the emergency release position. In the installation position of the emergency release lever, the securing projection is located outside the area between the two guide projections on the emergency release lever.

In order to install the emergency release lever, the pivot pin of the emergency release lever, which is in the installation position, merely needs to be axially slid past the securing projection into the bearing at the transmission housing. When the emergency release lever is subsequently pivoted into the normal position, the guide projections automatically enclose the securing projection such that the emergency release lever is axially secured without any securing components being required therefor, the securing components posing the risk of dropping into the transmission during installation.

The emergency release lever can be spring-loaded into the normal position in order to always hold the emergency release lever in the normal position during the normal operation of the parking lock.

For this purpose, the pivot pin can be easily enclosed at a distance by a preloaded helical spring, the one end of which is fixedly arranged at the transmission housing and the second end of which can force the emergency release lever into the normal position with preload.

No particular components for securing the helical spring in the installation position are required here, either.

A reliably defined normal position results by way of the emergency release lever resting, in the normal position, against a stop.

To ensure that the emergency release lever pivots smoothly, at least one of the guide projections has, on a side facing the securing projection, a protuberance projecting toward the securing projection.

Friction between the emergency release lever and the pegs is therefore largely prevented.

The emergency release lever is integrally joined with the guide projections such that the number of components is reduced, and can consist of a stamped and bent sheet-metal part.

The actuating element of the actuator can be an actuating rod, which has an actuating cam, which extends in parallel to the pivot pin and can be acted upon from the free end region of the emergency release lever toward the emergency release position.

If a gap forms between the emergency release lever and the actuating cam during normal operation of the parking lock and in the normal position of the emergency release lever, the actuating rod can move completely into the interlock position, uninfluenced by the emergency release lever.

As a result, upon installation of the emergency release lever, the actuating cam on the actuating rod is also automatically engaged from behind and no separate installation steps are required.

The actuator can be a parking lock cylinder, the actuating piston of which is the actuating element.

In order to pivot the emergency release lever in the case of an emergency release, the pivot pin can have an engagement contour, such as, for example, a key surface, at which a tool, such as, for example, a wrench, is couplable for rotationally driving the pivot pin.

Any other suitable drive of the emergency release lever, such as, for example, a motorized drive, is also possible, however.

The emergency release can be arranged in a chamber of the transmission housing such that the emergency release is protected against soiling and damage. Preferably, the chamber can be entirely or partially filled with a lubricating fluid.

BRIEF DESCRIPTION OF THE DRAWINGS

One exemplary embodiment of the invention is represented in the drawings and is described in greater detail in the following, wherein.

DETAILED DESCRIPTION

Figure 1:
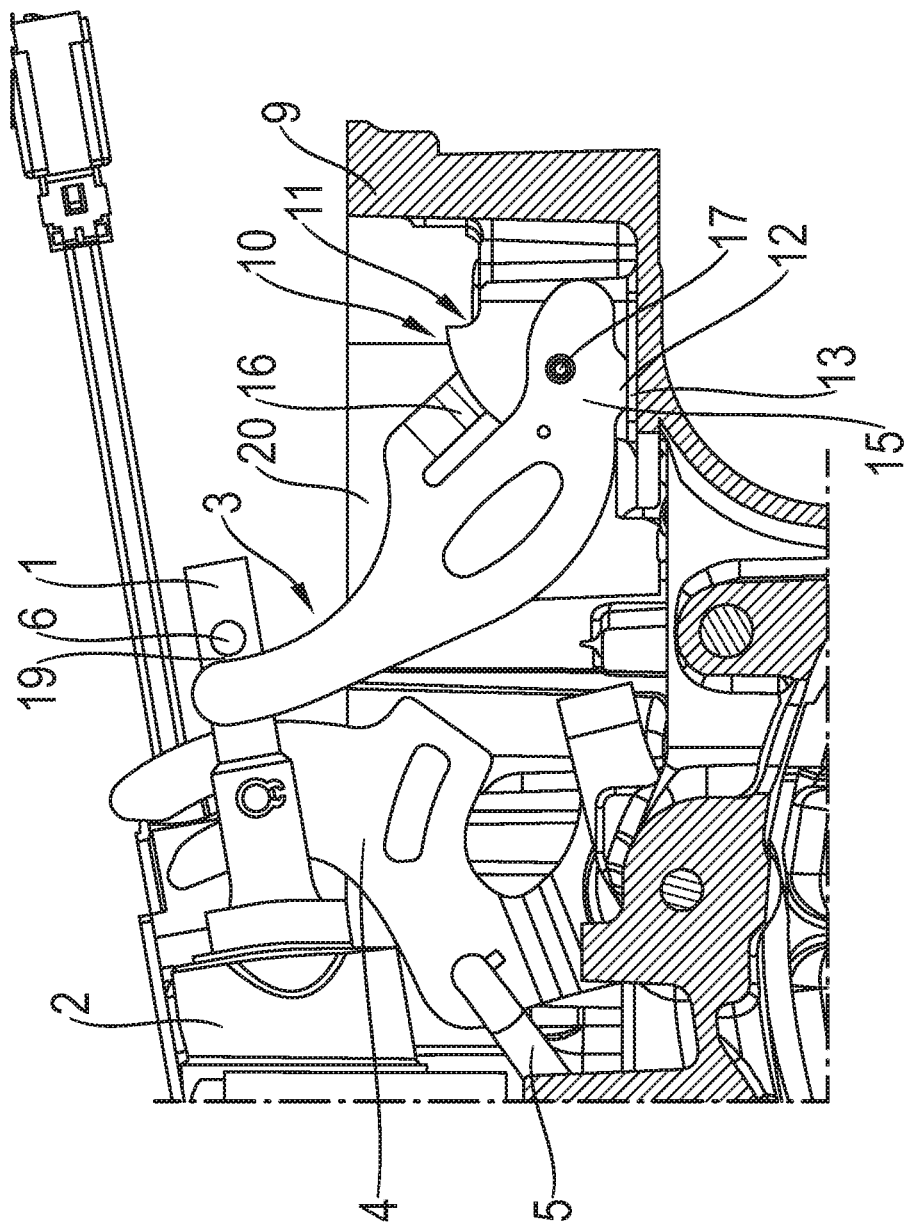
FIG. 1 shows a cutout portion of a parking lock with an emergency release in the normal position.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The figures show a cutout portion of a parking lock with an emergency release of a vehicle transmission arranged in a transmission housing 9. The emergency release is arranged in a chamber 20 of the transmission housing 9. The chamber 20 can be at least partially filled with a lubricating fluid.

An actuating piston 1 of a parking lock cylinder 2 is drivable so as to be movable between an interlock position and a release position of the parking lock. The actuating position 1 pivotably acts upon a pivoting lever 4, at which a connecting rod 5 is arranged, the connecting rod 5 extending to the parking lock (not shown).

The actuating piston 1 has an actuating cam 6, which radially protrudes from the actuating piston 1.

An emergency release lever 3 engages, via a free end of the emergency release lever 3 at one end region, behind the actuating cam 6 and is connected at the second end region to a pivot pin 7 for conjoint rotation. In the normal position of the parking lock, a gap 19 is present between the cam 6 and the emergency release lever 3.

The pivot pin 7 extends radially away from the emergency release lever 3 toward one side and is rotatably mounted in two bearing bores 8 in the transmission housing 9, the bearing bores 8 being axially spaced apart.

The transmission housing 9 has a securing projection 10, which has a contour at an upwardly directed area of the securing projection 10, which contour is concentric to the pivot pin 7 and has, at an area remote from the pivoting lever, a radially inwardly directed cutout portion 11.

Figure 2:
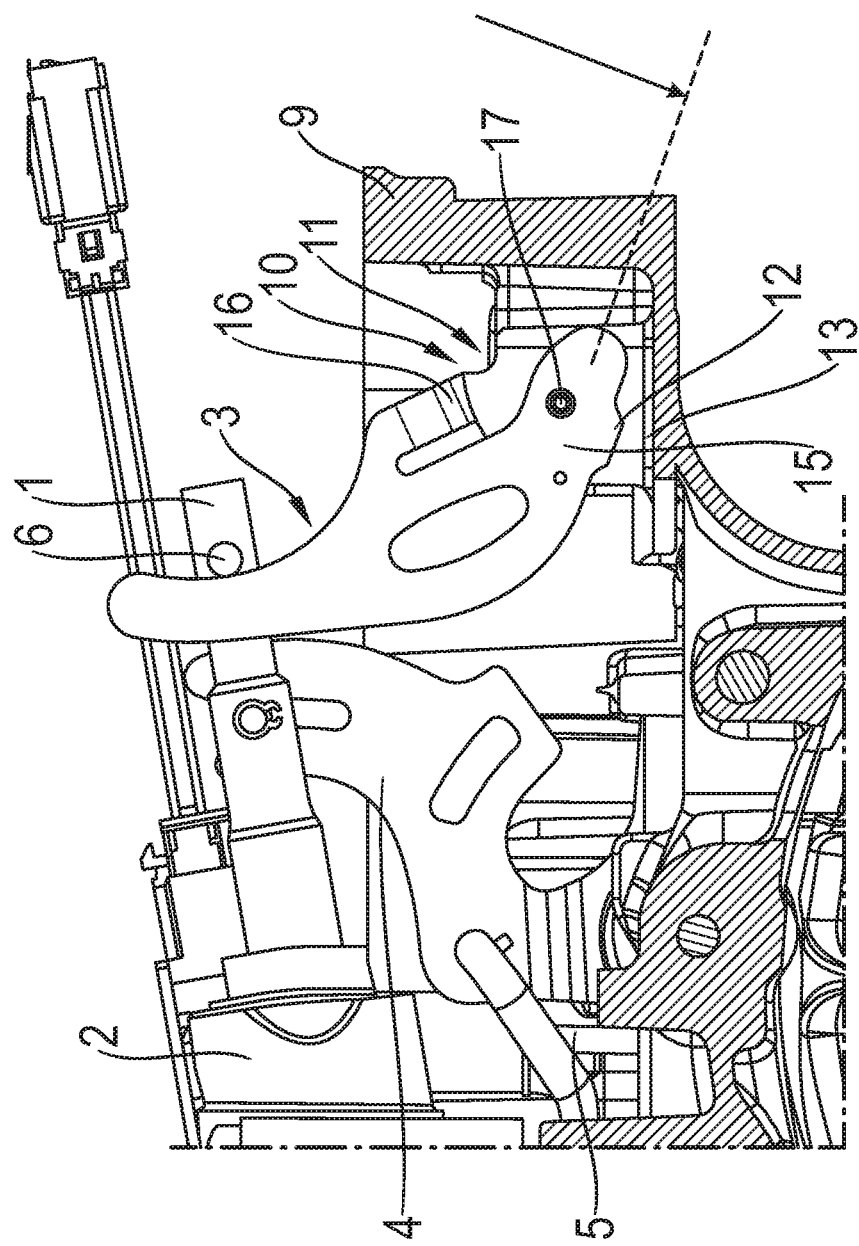
FIG. 2 shows the cutout portion of a parking lock with the emergency release from FIG. 1 in the emergency release position.
Figure 3:
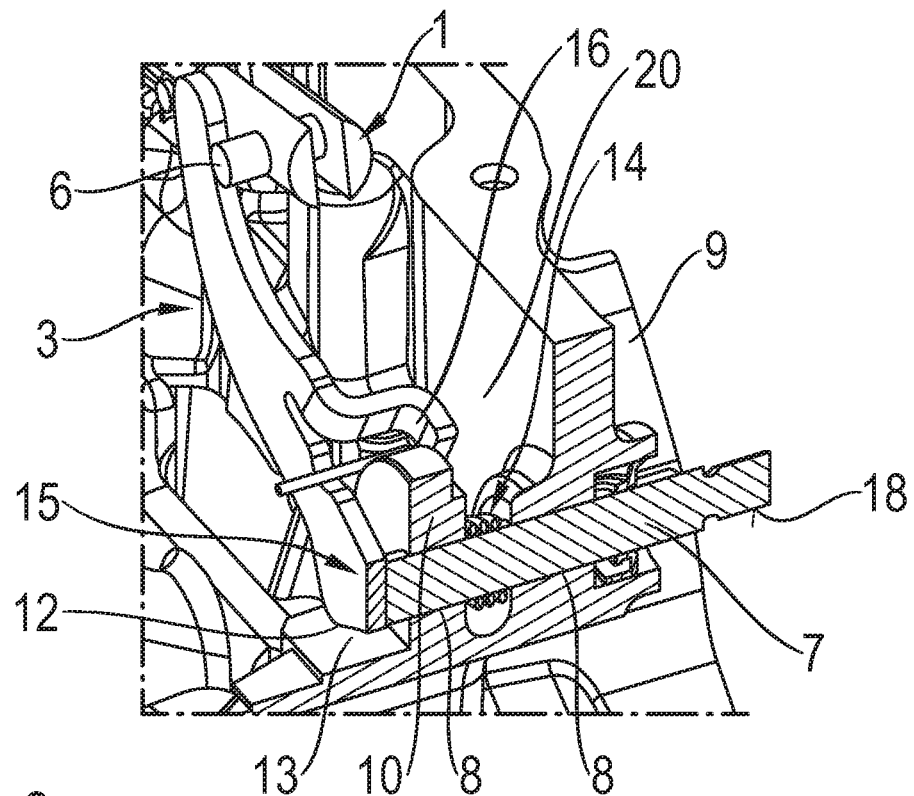
FIG. 3 shows a perspective partial sectional view of the emergency release from FIG. 1.
Figure 4:
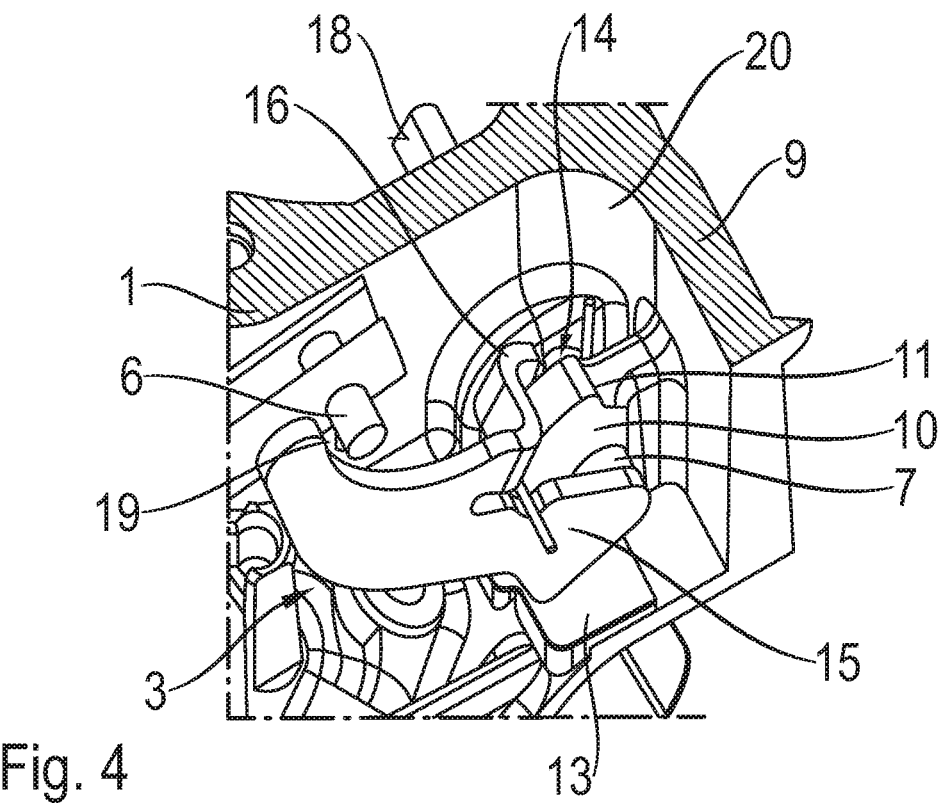
FIG. 4 shows a perspective top view of the emergency release from FIG. 1.
Figure 5:
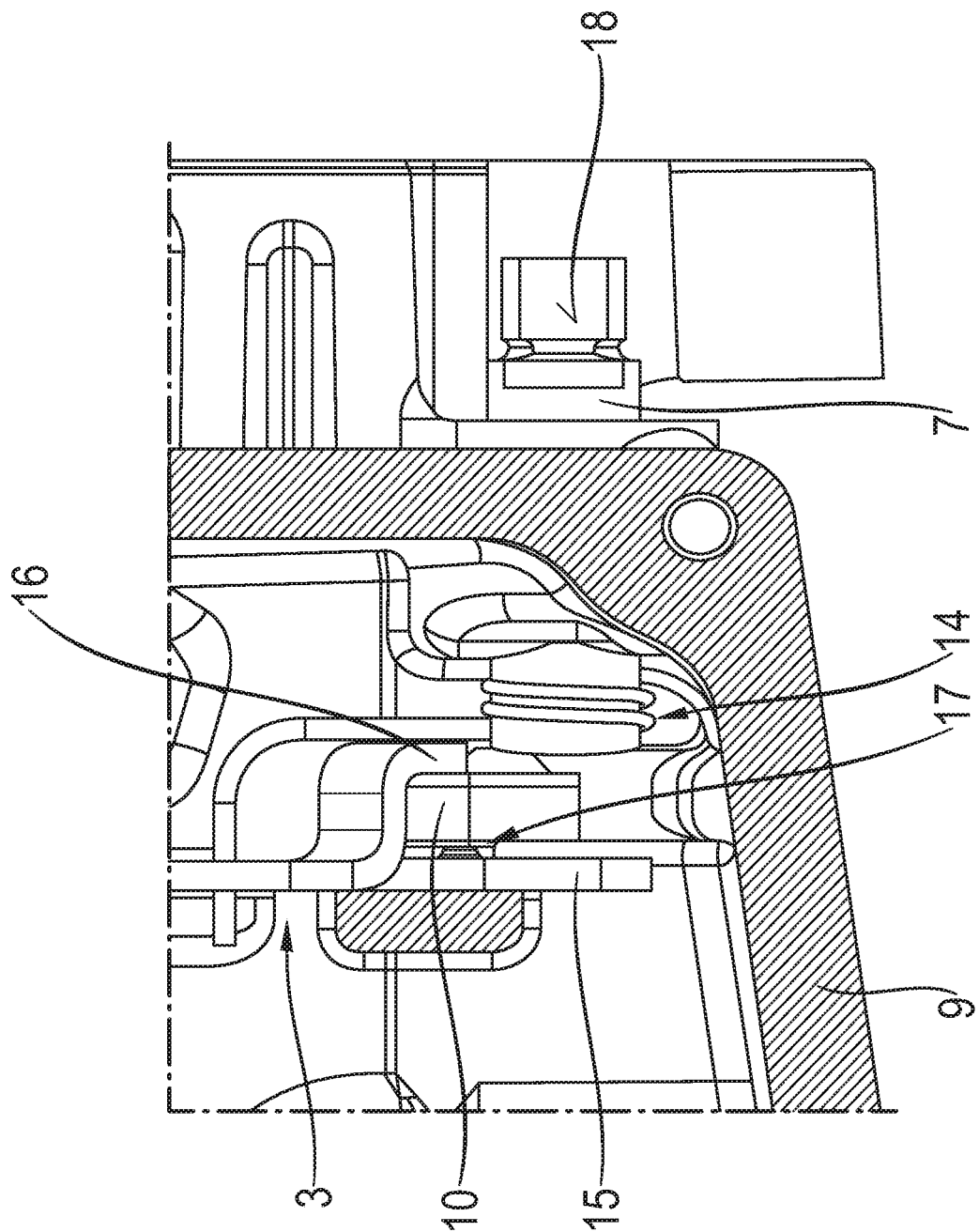
FIG. 5 shows a top view of the emergency release from FIG. 1.

After having been installed, the emergency release lever 3 is drivable so as to be pivotable between a normal position (FIG. 1) and an emergency release position (FIG. 2).

In the normal position, the emergency release lever 3 rests via a stop protuberance 12 against a stop 13 of the transmission housing 9 and is held in this contact position by a helical spring 14, which surrounds the pivot pin 7 at a radial distance and is supported at one end at the transmission housing 9. Via the other end, the preloaded helical spring 14 forces the emergency release lever 3 into the normal position, wherein the stop protuberance 12 rests against the stop 13.

The emergency release lever 3 is formed as a stamped and bent sheet-metal part and is formed, at its end area facing the pivot pin, having two guide projections 15 and 16, which are parallel to each other. The one guide projection 15 is fixedly connected to the pivot pin 7, while the guide projection 16 is shorter than the guide projection 15 and ends, unsupported, at a radial distance from the pivot pin 7. The distance between the two guide projections 15 and 16 approximately corresponds to the axial width of the securing projection 10.

In order to install the emergency release lever 3, the emergency release lever 3 is brought into an installation position in which the emergency release lever 3 is pivoted in the clockwise direction past the emergency release position, and the pivot pin 7 is guided through the bearing bore 8 in the securing projection 10. Thereupon, the helical spring 14 is retained coaxially to the bearing bore 8 and one limb is supported against the transmission housing 9 and the other limb is supported against the emergency release lever 3, and the pivot pin 7 is slid through the helical spring 14 and the bearing bore 8 in the transmission housing 9 until the guide projection 15 axially comes to rest against the securing projection 10 via a protuberance 17 protruding toward the securing projection 10. During this axial movement, the emergency release lever 3 is pivoted out of the installation position past the emergency release position into the normal position.

The first free end of the emergency release lever 3 also engages behind the actuating cam 6 on the actuating piston 1 on the side of the actuating cam 6 that is closer to the parking lock cylinder 2.

Under the effect of the helical spring 14, the emergency release lever 3 then continues to rest via the stop protuberance 12 against the stop 13 of the transmission housing 9 and is pivoted into the normal position, and is therefore ready for operation.

At the free end projecting out of the bearing bores 8, the pivot pin 7 is provided with a key surface 18, which is connectable to a tool (not shown) in order to pivot the emergency release lever 3 into the emergency release position for the emergency release of the parking lock, the emergency release lever 3 pivoting the actuating piston 1 via the actuating cam 6 into the emergency release position of the actuating piston 1.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 actuating piston
2 parking lock cylinder
3 emergency release lever
4 pivoting lever
5 connecting rod
6 actuating cam
7 pivot pin
8 bearing bores
9 transmission housing
10 securing projection
11 cutout portion 12 stop protuberance
13 stop
14 helical spring
15 guide projection
16 guide projection
17 protuberance
18 key surface
19 gap
20 chamber

The invention claimed is:

1. An emergency release of a parking lock of a vehicle transmission arranged in a transmission housing (9), comprising:
 an actuating element of an actuator for actuating the parking lock, the actuating element drivable so as to be linearly movable between an interlock position and a release position;
 an emergency release lever (3), the actuating element actuatable from a first end region of the emergency release lever (3) so as to be movable away from the interlock position past the release position into an emergency release position; and
 a pivot pin (7) radially projecting from the emergency release lever (3) and mounted at the transmission housing (9) so as to be pivotable about a longitudinal axis, the emergency release lever (3) connected at a second end region to the pivot pin (7) for conjoint rotation,
 wherein, when the actuating element is in the interlock position and in the release position, the emergency release lever (3) is in a normal position, from which the emergency release lever (3) is drivable so as to be pivotable into the emergency release position,
 wherein the emergency release lever (3) is pivotable away from the normal position past the emergency release position into an installation position,
 wherein the emergency release lever (3), in the second end region, comprises two guide projections (15, 16) arranged parallel to each other and extending radially toward the pivot pin (7),
 wherein a securing projection (10) is fixedly connected to the transmission housing (9) and projects between the two guide projections (15, 16) when the emergency release lever (3) is in the normal position and in the emergency release position, and
 wherein, in the installation position of the emergency release lever (3), the securing projection (10) is located outside the area between the two guide projections (15, 16) on the emergency release lever (3).

2. The emergency release of claim 1, wherein the emergency release lever (3) is spring-loaded into the normal position.

3. The emergency release of claim 2, wherein the pivot pin (7) is enclosed at a distance by a preloaded helical spring (14), one end of the preloaded helical spring (14) is fixedly arranged at the transmission housing (9) and the opposite end of the preloaded helical spring (14) urges the emergency release lever (3) into the normal position with preload.

4. The emergency release of claim 1, wherein the emergency release lever (3) rests, in the normal position, against a stop (13).

5. The emergency release of claim 1, wherein at least one of the two guide projections (15) comprises, on a side facing the securing projection (10), a protuberance (17) projecting toward the securing projection (10).

6. The emergency release of claim 1, wherein the emergency release lever (3) is integrally joined with the two guide projections (15, 16).

7. The emergency release of claim 1, wherein the actuating element of the actuator comprises an actuating rod with an actuating cam (6) that extends parallel to the pivot pin (7) and is actable upon from a free end region of the emergency release lever (3) toward the emergency release position.

8. The emergency release of claim 7, wherein a gap (19) is defined between the emergency release lever (3) and the actuating cam (6) during normal operation of the parking lock and in the normal position of the emergency release lever (3).

9. The emergency release of claim 1, wherein the actuator comprises a parking lock cylinder (2), and the actuating element comprises an actuating piston (1) of the parking lock cylinder (2).

10. The emergency release of claim 1, wherein the pivot pin (7) comprises an engagement contour, at which a tool is couplable for rotationally driving the pivot pin (7).

11. The emergency release of claim 1, wherein the emergency release is arranged in a chamber (20) of the transmission housing (9).

* * * * *